United States Patent (10) Patent No.: US 6,493,377 B2
Schilling et al. (45) Date of Patent: Dec. 10, 2002

(54) DISTRIBUTED NETWORK, SPREAD-SPECTRUM SYSTEM

(75) Inventors: Donald L. Schilling, Palm Beach Gardens, FL (US); Joseph Garodnick, Centerville, MA (US)

(73) Assignee: Linex Technologies, Inc., West Long Branch, NJ (US)

( * ) Notice: Subject to any disclaimer, the term of this patent is extended or adjusted under 35 U.S.C. 154(b) by 62 days.

(21) Appl. No.: 09/729,911

(22) Filed: Dec. 6, 2000

(65) Prior Publication Data

US 2002/0067756 A1 Jun. 6, 2002

(51) Int. Cl.[7] .................................................. H04B 1/69
(52) U.S. Cl. ...................... 375/130; 370/342; 370/353; 370/441
(58) Field of Search ........................ 375/130; 370/320, 370/335, 342, 441, 352, 353, 354, 355, 356

(56) References Cited

U.S. PATENT DOCUMENTS

| 5,455,865 | A | * | 10/1995 | Perlman ..................... 370/445 |
| 5,604,869 | A | * | 2/1997 | Mincher et al. ............ 370/280 |
| 5,742,593 | A | * | 4/1998 | Sharony et al. ............. 370/280 |
| 6,301,239 | B1 | * | 10/2001 | Chuprun et al. ............ 370/342 |

* cited by examiner

*Primary Examiner*—Don N. Vo
(74) *Attorney, Agent, or Firm*—David Newman Chartered (57) ABSTRACT

A distributed network, spread-spectrum system comprising a plurality of remote stations and a plurality of nodes. One or more hub node(s) connect(s) to a central telephone office. A node's spread-spectrum transceiver communicates, using packets having spread-spectrum modulation, over radio waves, with the plurality of remote stations. Each packet has a source address and a destination address, and may have other information such as a header, start of message, end of message, flow-control information, forward error correction, and message data. A store-and-forward subsystem stores and forwards one or more packets to and from the remote station. The store-and-forward subsystem stores and forwards the one or more packets to and from another node in the plurality of nodes. A flow-control subsystem controls the store-and-forward subsystem, to store each packet arriving at the spread-spectrum transceiver. The flow-control subsystem communicates traffic information between each of the nodes in the plurality of nodes. The flow-control subsystem routes the packet through appropriate nodes to the hub node from a remote station. Based on the traffic at each node, the flow-control subsystem transmits the packet from the hub node to an appropriate node, and routes the packet to a recipient remote station. The flow-control subsystem routes the plurality of packets through a path in the plurality of nodes to ensure that the plurality of packets arrive sequentially for voice or video packets.

37 Claims, 6 Drawing Sheets

DISTRIBUTED NETWORK, SPREAD-SPECTRUM SYSTEM

BACKGROUND OF THE INVENTION

This invention relates to spread-spectrum communications, and more particularly to a wireless distributed network for reducing power and power variations, when transmitting packets having spread-spectrum modulation.

DESCRIPTION OF THE RELEVANT ART

As the data rate increases, the power transmitted by a cellular "telephone" and by the cellular base station (BS) must also increase to ensure a low probability of error. As illustratively shown in FIG. 1, a star network, as is presently used for cellular networks, is used to communicate data between a central office 50 and a plurality of remote stations (RS). A plurality of base stations 20, 30, 40, communicate directly with the central office 50. A first base station 20 communicates data between a first plurality of remote stations 21, 22, 23, 24. A second base station 30 communicates data between a second plurality of remote stations 31, 32, 33, 34, 35, 36. A third base station 40 communicates data between a third plurality of remote stations 41, 42, 43, 44, 45.

Figure 1:
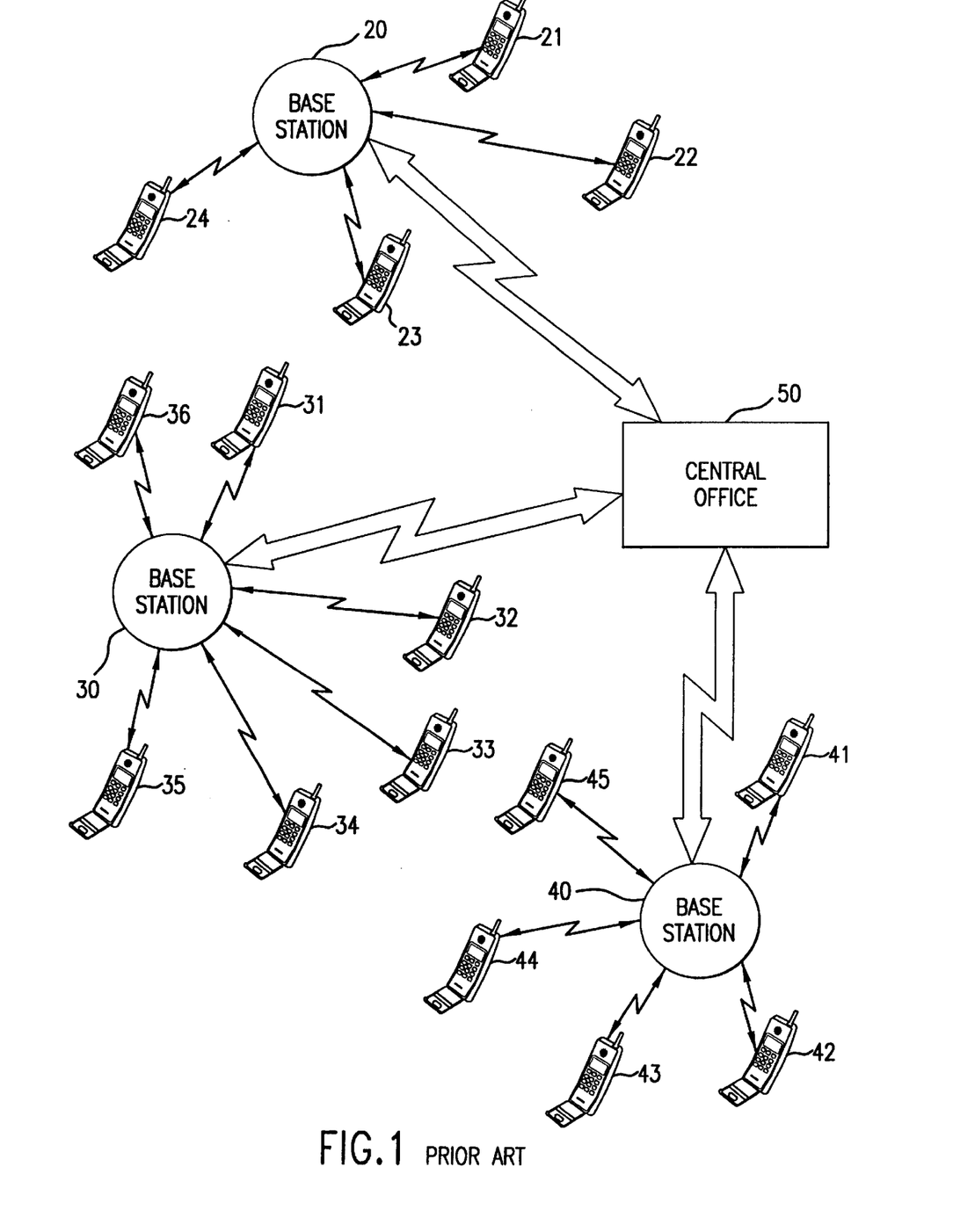
FIG. 1 is a block diagram of a current cellular spread-spectrum system, showing all base stations communicating with a central office.

In the star network of FIG. 1, data, in general, are not communicated directly between base stations, but through the central office 50. The routing of data is a fixed communication path, from a remote station through a base station to the central office, and vice versa. Data generally are not routed, with dynamically changing paths, between remote stations which communicate with a base station, and data are not routed between remote stations directly through base stations, without passing through the central office 50. Also, data are not routed to the central office 50, using communications paths which dynamically vary between base stations, depending upon availability.

The power transmitted by the base station and the remote stations, and the ability to properly control the power, are problems which are growing in importance with the start of third generation (3G) wireless systems, which stresses data transmission which requires low error rates and Internet access.

Previously, a user could transmit data at the rate of 9.6 kilobit per second (Kb/s). Now, with 3G wireless systems, this rate is increasing to 384 kb/s and higher. For the increased data rates, the power must increase by a factor of 40 or more to ensure no degradation of performance.

A proposed solution to this problem is to install additional base stations, or towers. This is a very costly solution since some base stations will be overloaded with traffic and other base stations underutilized. This solution, however, certainly will reduce the power transmitted. Users who are distant from the base station still will be required to transmit significantly larger power than users located near the base station, to alleviate the near-far power problem. This very significant difference in distance and therefore in transmitted power, requires very accurate power control, which is a limiting feature in the current, standardized, 3G system. For example, consider acquisition: One limitation is effective packet size; that is, it takes significant time for the base station to help the user adjust its transmit power to the correct level. As more time is required, the packet will, in effect, increase in length, using time which could be allocated for data transmission or the transmission of additional data packets. This "ramp up" time could exceed the duration of the data portion of the packet itself. As another example, during power control adjustment, a user transmitting with too much power can increase the error rate of a user transmitting at the proper power level.

The present base station multi-access scheme currently in use is not a preferred system approach.

SUMMARY OF THE INVENTION

A general object of the invention is to increase capacity of data from remote stations to a central office.

Another object of the invention is to reduce power levels and power level variations required for transmitting from remote stations and from the base stations.

An additional object of the invention is a more flexible network, which dynamically adapts to changing data requirements between remote stations and a central office.

According to the present invention, as embodied and broadly described herein, a distributed network, spread-spectrum system is provided, comprising a plurality of remote stations and a plurality of nodes. The plurality of nodes forms the distributed network. The distributed network plus the plurality of remote stations form the distributed system. In the plurality of nodes, one or more nodes are hub nodes, which connect to a central telephone office. The plurality of nodes covers a geographic area. Each node covers a micro-cell having a radius, which, typically, is less than one mile. Each node includes a plurality of spread-spectrum transceivers, or, equivalently, a plurality of spread-spectrum transmitters and a plurality of spread-spectrum receivers. Each node also includes a store-and-forward subsystem, and a flow-control subsystem, at least one node transmitter, and more typically a plurality of node transmitters, and at least one node receiver and more typically a plurality of node receivers.

Transmission between the remote station and a node is through the use of CDMA modulation, although any other modulation technique may be employed. Transmitting between nodes may be by cable, fiber optic cable, or microwave link, using any of a variety of modulation techniques. Steerable antennas may be employed. Such modulation and communications channels are well-known in the art.

Each node's spread-spectrum transceiver communicates, using packets having spread-spectrum modulation, over radio waves, with a plurality of remote stations. Each packet has a source address and a destination address, and may contain other information such as flow-control information, forward error correction, and message data. The store-and-forward subsystem stores and forwards one or more packets to and/or from the remote station. The store-and-forward subsystem stores and forwards the one or more packets to and from another node in the plurality of nodes.

A node transmitter communicates with a node receiver located at a different node from the transmitting node.

The flow-control subsystem in the distributed network controls the store-and-forward subsystem, to store each packet arriving at the spread-spectrum transceiver. The flow-control subsystem communicates traffic information between each of the nodes in the plurality of nodes. The traffic information typically includes traffic density at each of the nodes and node-memory availability. Using the traffic information, and in response to a packet having the destination address to the hub node, the flow-control subsystem routes the packet through appropriate nodes to the hub node or, in the case of a "local call", to the remote user directly. A "local call" is defined as a call between remote stations located within (i.e., accessing) the same distributed network. For the local call, the central office connection is not required.

Based on the traffic at each node, and each packet having a destination address to a remote station, the flow-control subsystem transmits the packet from a central office to an appropriate hub node to an appropriate node, and routes the packet to the next recipient node. Each packet in a message may traverse a different route. In response to a plurality of packets having voice data, the flow-control subsystem routes the plurality of packets through the same path in the plurality of nodes to ensure that the plurality of packets arrive sequentially. The flow control procedure balances the activity in each node relative to other nodes in the distributed network.

When an information packet(s) arrives from a remote station, the node routes the packet(s) to an appropriate second recipient node on the way to an intended hub node and central office, toward the destination address.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings, wherein like reference numerals indicate like elements throughout the several views.

Figure 2:
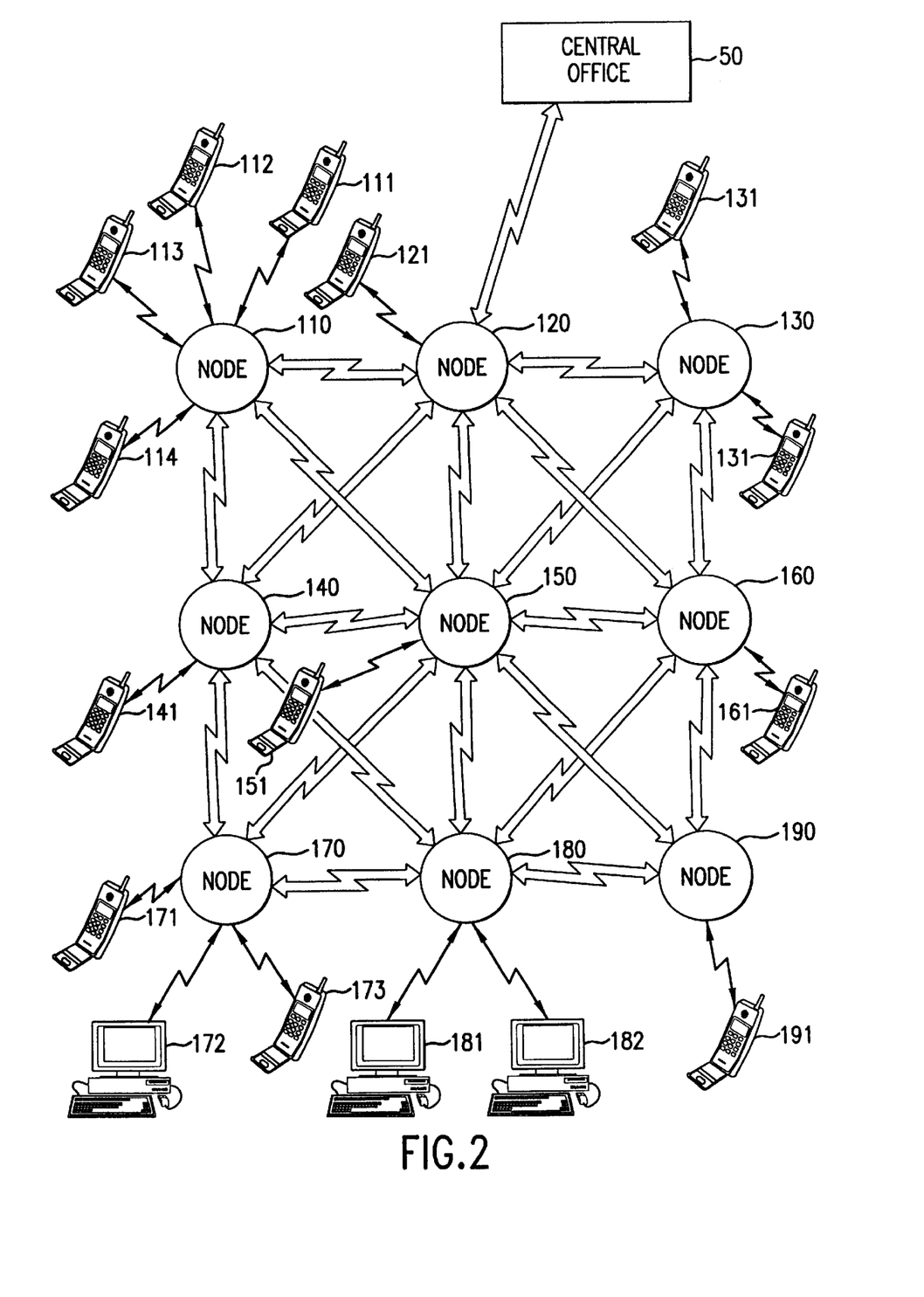
FIG. 2 is a block diagram of a distributed network, spread-spectrum system.

As illustratively shown in FIG. 2, a distributed network, spread-spectrum system is provided, comprising a plurality of remote stations and a plurality of nodes 110, 120, 130, 140, 150, 160, 170 180, 190. The plurality of nodes 110, 120, 130, 140, 150, 160, 170 180, 190 forms the distributed network. The distributed network plus the plurality of remote stations form the distributed system. The plurality of nodes 110, 120, 130, 140, 150, 160, 170 180, 190 of FIG. 2, depicts, by way of example, a first node 110, a second node, 120, a third node 130, a fourth node 140, a fifth node 150, a sixth node 160, a seventh node 170, an eighth node 180 and a ninth node 190.

Figure 3:
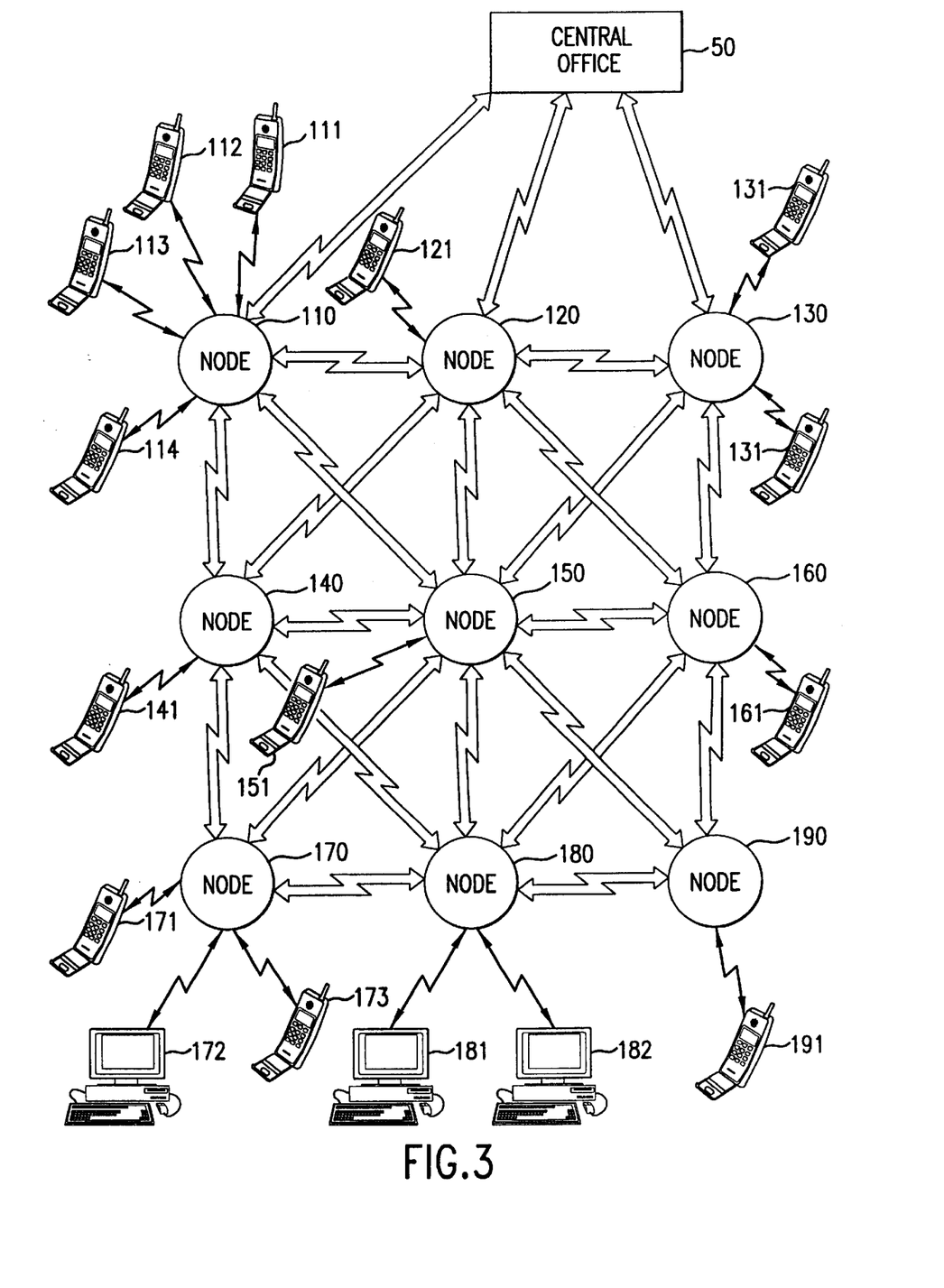
FIG. 3 is a block diagram of a distributed network, spread-spectrum system.

In the plurality of nodes 110, 120, 130, 140, 150, 160, 170 180, 190, one node, the second node 120, is a hub node, which communicates to a central telephone office 50. Thus, there may be a plurality of hubs. In an alternative embodiment, as shown in FIG. 3, a set of the plurality of nodes (hubs) communicates to the central office 50. The set of the plurality of nodes (hubs), may include the entire plurality of nodes.

The plurality of nodes 110, 120, 130, 140, 150, 160, 170 180, 190 covers a geographic area. Each node in the plurality of nodes 110, 120, 130, 140, 150, 160, 170 180, 190 covers a micro-cell having a radius much less than one mile.

Figure 4:
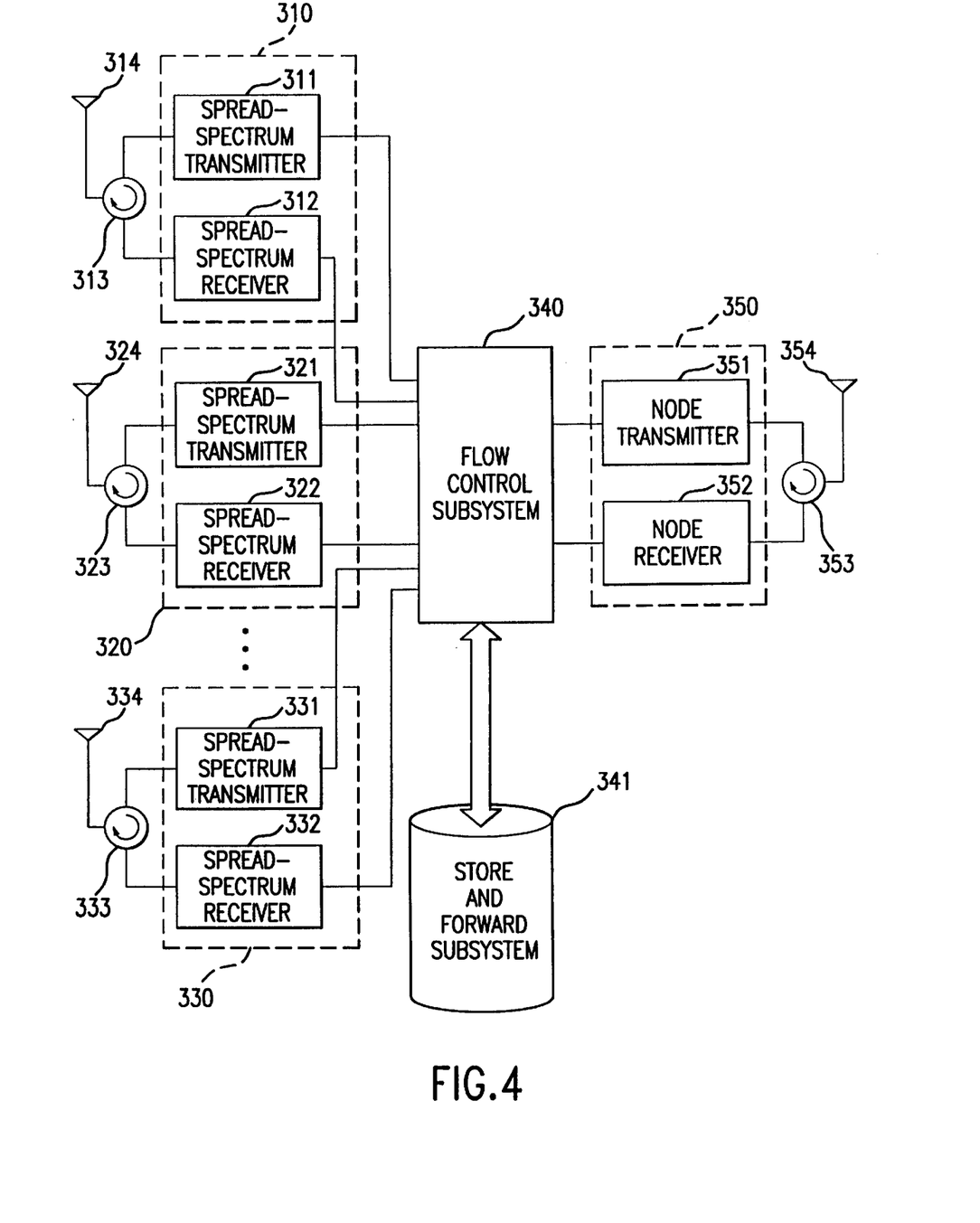
FIG. 4 is a block diagram illustrating key elements of a node with a central office communicating with a set of a plurality of nodes.
Figure 5:
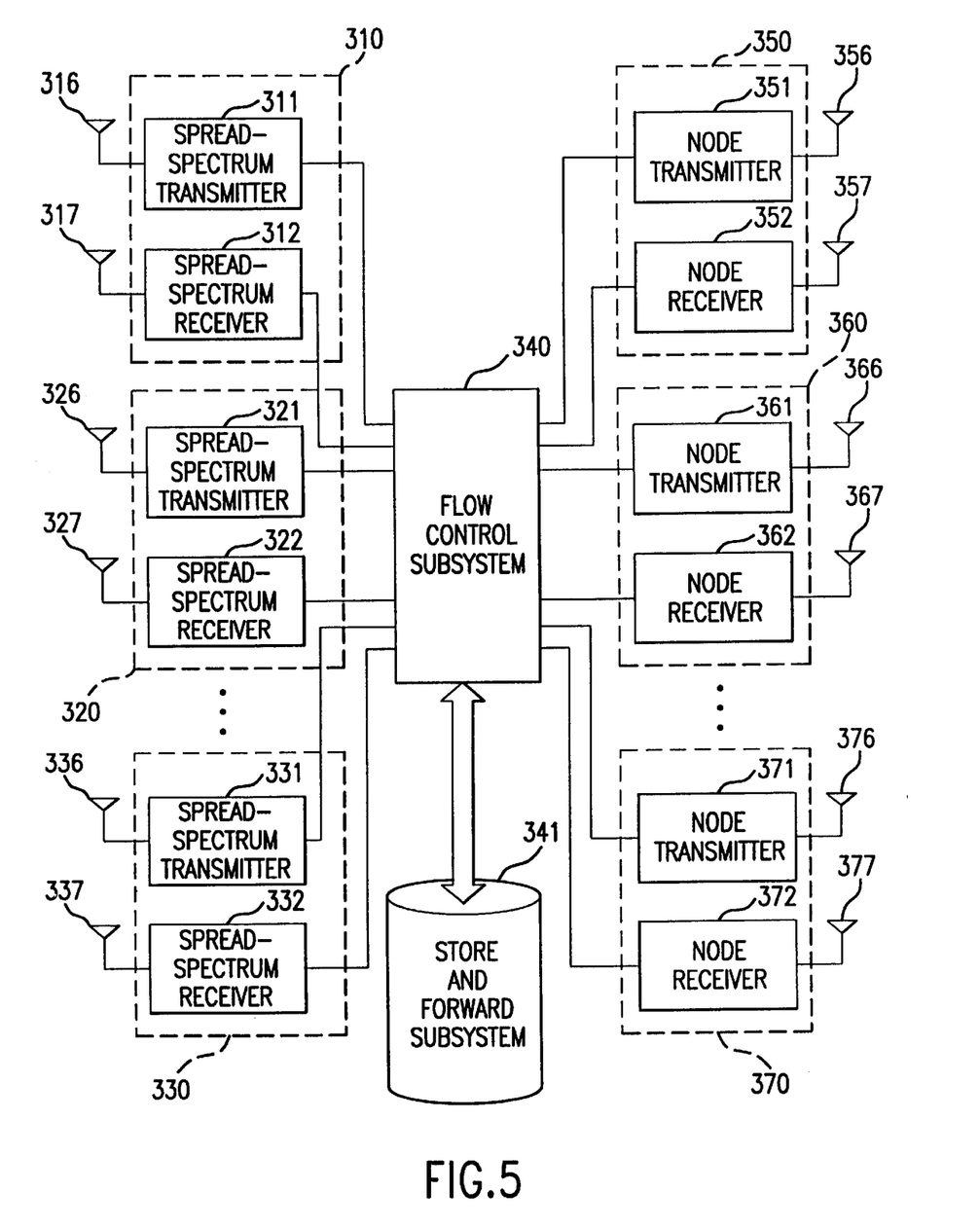
FIG. 5 is an alternative block diagram illustrating key elements of a node.

FIGS. 4 and 5 illustratively show an example of what might be at each node. For communicating between nodes, in FIG. 4, for example, there is a node transceiver 350, or equivalently, a node transmitter 351 and a node receiver 352. The node transmitter 351 and the node receiver 352 are coupled through a node isolator 353 to a node antenna 354. Transceiver 350 can be at microwave frequencies or connect to a fiber optic link or any other channel capable of handling the traffic between nodes.

FIG. 5 shows an example of a plurality of node transceivers 350, 360 and 370, or equivalently, a plurality of node transmitters 351, 361, 371 and a plurality of node receivers 352, 362, 372. In place of using a single antenna and an isolator, the first node transmitter 351 is coupled to a first node-transmitter antenna 356, and the first node receiver 352 is coupled to the first node-receiver antenna 357. Similarly, the second node transmitter 361 is coupled to a second node-transmitter antenna 366 and the second node receiver 362 is coupled to the second node-receiver antenna 367, and the third node transmitter 371 is coupled to the third node-transmitter antenna 376 and the third node receiver 372 is coupled to the third node-receiver antenna 377. The antennas could be omnidirectional, sectored, or steerable (smart) antennas.

With each node using the node transmitter 351 and the node receiver 352, of FIG. 4, or the plurality of node transmitters 351, 361, 371 and the plurality of node receivers, 352, 362, 372 of FIG. 5, a node communicates with a different node having a node transmitter and node receiver node receiver. Thus, in the plurality of nodes 110, 120, 130, 140, 150, 160, 170 180, 190, the first node 110 communicates with the second node 120, the fourth node 140 and the fifth node 150. The second node 120 communicates with the first node 110, the third node 130, the fourth node 140, the fifth node 150 and the sixth node 160. The third node communicates with the second node 120, the fifth node 150 and the sixth node 160. The fourth node communicates with the first node 110, the second node 120, the fifth node 150, the seventh node 170 and the eighth node 180. The fifth node communicates with the first node 110, the second node 120, the third node 130, the fourth node 140, the sixth node 160, the seventh node 170, the eighth node 180 and the ninth node 190. The sixth node 160 communicates with the second node 120, the third node 130, the fifth node 150, the eighth node 180 and the ninth node 190. The seventh node 170 communicates with the fourth node 140, the fifth node 150 and the eighth node 180. The eighth node 180 communicates with the fourth node 140, the fifth node 150, the sixth node 160, the seventh node 170 and the ninth node 190. The ninth node communicates with the fifth node 150, the sixth node 160 and the eighth node 180.

Each node may include a plurality of spread-spectrum transceivers 310, 320, 330, or, equivalently, a plurality of spread-spectrum transmitters 311, 321, 331 and a plurality of spread-spectrum receivers 312, 322, 332, a store-and-forward subsystem 341, and a flow-control subsystem 340. The flow-control subsystem 340 typically would include a processor or computer. The store-and-forward subsystem 341 typically would include memory and the memory may be part of the computer embodying the processor for the flow-control subsystem 340. The memory may be random access memory (RAM) or hard drive, or other volatile or non-volatile memory and memory storage device. Other devices are well-known in the art, and include hard drives, magnetic tapes, compact disk (CD), and other laser/optical memories and bubble memory devices. The particular flow-control subsystem 340 and the store-and-forward subsystem 341 would be specified by a particular system requirements and design criteria.

Each node in the plurality of nodes 110, 120, 130, 140, 150, 160, 170 180, 190 also includes at least one node transmitter 351, and more typically a plurality of node transmitters 351, 361, 371 and at least one node receiver 352 and more typically a plurality of node receivers 352, 362, 372.

The store-and-forward subsystem 341 is coupled to and controlled by the flow-control subsystem 340. The plurality of spread-spectrum transmitters 311, 321, 331, are coupled between a plurality of spread-spectrum antennas 316, 326, 336 and the flow-control subsystem 340. The plurality of spread-spectrum receivers 312, 322, 332 are coupled between a plurality of receiver antennas 317, 327, 337 and the flow-control subsystem 340. FIGS. 2 and 3 show the first node 110 communicating with a first plurality of remote stations 111, 112, 113, 114. The second node 120 communicates with a second plurality of remote stations, with FIGS. 2 and 3 showing a first remote station 121 of the second plurality of remote stations. The third node 130 communicates with a third plurality of remote stations 131, 132 and the fourth node 140, the fifth node 150 and the sixth node 160 communicate with a fourth plurality of remote stations, a fifth plurality of remote stations, and a sixth plurality of remote stations, respectively. FIGS. 2 and 3 show the fourth node 140 communicating with a first remote station 141 of the fourth plurality of remote stations, the fifth node 150 communicating with a first remote station 151 of the fifth plurality of remote stations, and the sixth node 160 communicating with a first remote station 161 of the sixth plurality of remote stations. The seventh node 170 and the eighth node 180 are shown communicating with a seventh plurality of remote stations 171, 172, 173 and an eighth plurality of remote stations 181, 182, respectively. The ninth node 190 communicates with a ninth plurality of remote stations, and FIGS. 2 and 3 show the ninth node 190 communicating with a first remote station 191 of the ninth plurality of remote stations.

Figure 6:
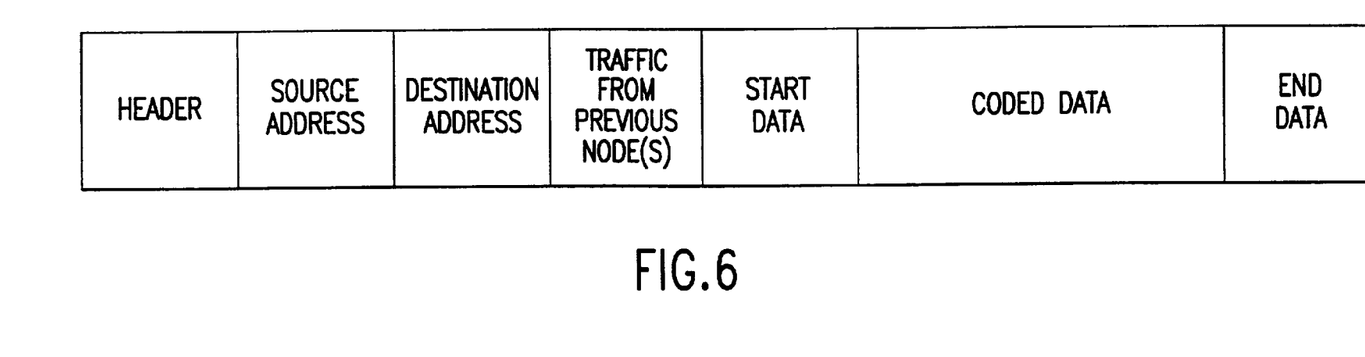
FIG. 6 shows a representative example of a packet.

Each node's spread-spectrum transceiver, or equivalently spread-spectrum transmitter and spread-spectrum receiver, communicates, using packets having spread-spectrum modulation, over radio waves, with the plurality of remote stations. Each packet has a source address and a destination address, and may have header, start of data, end of data, and other information such as flow-control information, forward error correction, and message data. FIG. 6 shows, by way of example, one way a packet may be structured.

The store-and-forward subsystem 341 stores and forwards one or more packets to and from the remote station. The store-and-forward subsystem 341 stores and forwards the one or more packets to and from another node in the plurality of nodes 110, 120, 130, 140, 150, 160, 170 180, 190.

The flow-control subsystem 340 in the distributed network controls the store-and-forward subsystem, to store each packet arriving at the spread-spectrum transceiver. In a preferred embodiment, the flow-control subsystem 340 also is distributed throughout the network, with a flow-control subsystem 340 resident at each node. It is possible, of course, to have a central flow-control system. The flow-control subsystem 340 communicates traffic information between each of the nodes in the plurality of nodes. The traffic information typically includes traffic density at each of the nodes and memory availability. Using the traffic information and in response to a packet having the destination address to the hub node, the flow-control subsystem 340 routes the packet through appropriate nodes to the appropriate hub node. Based on the traffic at each node, and each packet having a destination address to either the hub or a remote station, the flow-control subsystem 340 transmits the packet from the hub node to an appropriate node, and routes the packet to the first recipient node. Each packet may traverse a different route en route to the remote station.

In response to the traffic congestion and to a plurality of packets having voice data, the flow-control subsystem routes the plurality of packets through a path in the plurality of nodes to ensure that the plurality of packets arrive sequentially. The flow control procedure balances the activity in each node relative to other nodes in the distributed network.

When an information packet arrives from a central office, the hub node routes the information packet to an appropriate second recipient node on the way to an intended remote station destination address.

Consider, by way of example, FIG. 3, with calls from the central office 50 to remote stations. There is a set of nodes (hubs) 110, 120 130 who tell the central office 50 of the availability of each hub node 110, 120, 130. By having a set of hub nodes, the central office has redundancy, in case of hub node failure, for sending and receiving packets to and from remote stations. Based on availability of a hub node, a packet is sent to a particular hub node, which is available. If two or more hub nodes are available, any of the available hub nodes can be the recipient of the packet.

Each hub keeps track of the traffic flow, memory availability, of many nodes. The first nodes of which are kept track, include the closest surrounding nodes, as defined by design criteria. The next set of node(s) where the hub keeps information might be the next layer of closest nodes.

When sending a packet from a hub to a remote station, the path routing the packet through various nodes is not known, a priori, except maybe for voice. Typically, a packet is forwarded from the hub to a node, which is on the particular path to the remote user. Nodes chosen for a particular path have available capacity and storage, and can forward the packet to a subsequent node. This ability is called "look ahead".

The packet passes through various nodes, until the packet reaches the remote station. Since the path is not predefined, and not necessarily a direct part "as the crow flies", paths for several packet for the same remote station can be different.

For packets passing from a remote station to the central office 50, the remote station accesses the nearest node. The packet is forwarded, node to node, until the packet arrives at the hub. Paths for packets are not predefined, and can be different for different packets from the remote station to the hub.

For local calls within the distributed network, there is no need for packets going to a hub or central office. Instead, if the data are sent to another remote station located within the distributed network, the packet enters the distributed network through a node near the remote station sending the packet, and exits the distributed network from a node near the recipient remote station. The packet does not travel a predefined path, and different packets from the sending remote station can travel different paths to the recipient remote station. This depends on the destination address as in a phone system.

An advantage of the present invention is that the nodes and the connected remote stations form micro-cells. Thus, low power can be used by the remote stations, and by nodes (base stations), reducing the potential of radio frequency effects on the user of the remote station, such as RF burns, brain tumors, etc. Handoff for a remote station traveling between nodes can be done in any of the standard ways available for packet communications and base stations. One such technique is for the remote station to monitor the control signals from several of the strongest nodes (base stations). When the signal strength from the node (base station) being used by the remote station falls below a threshold, then the remote station transmits the next packet to a node having the largest signal strength being monitored by the remote station.

Each node is small and can be mounted on telephone poles, building, etc. The nodes require little space and low amounts of power.

It will be apparent to those skilled in the art that various modifications can be made to the distributed network, spread-spectrum system of the instant invention without departing from the scope or spirit of the invention, and it is intended that the present invention cover modifications and variations of the distributed network, spread-spectrum system provided they come within the scope of the appended claims and their equivalents.

We claim:

1. A distributed network, spread-spectrum system, comprising:
   a plurality of remote stations;
   a plurality of nodes for covering a geographic area, the plurality of nodes including a hub node, each node covering a micro-cell having a radius less than one mile, each node including,
      a spread-spectrum transceiver for communicating, using packets having spread-spectrum modulation, over radio waves, with the plurality of remote stations, each packet having a source address and a destination address;
      a store-and-forward subsystem, coupled to the spread-spectrum transceiver, for storing and forwarding one or more packets to and from the remote station, and for storing and forwarding the one or more packets to and from another node in the plurality of nodes;
      a flow-control subsystem, coupled to the store-and-forward subsystem, for controlling the store-and-forward subsystem, to store each packet arriving at the spread-spectrum transceiver, said flow-control subsystem communicating traffic information between each of the nodes in the plurality of nodes, with the traffic information including traffic density at each of the nodes, said flow-control subsystem, responsive to the traffic information and to a packet having the destination address to the hub node, for routing the packet through appropriate nodes to the hub node, said flow-control subsystem, responsive to the traffic at each node, each packet having a destination address to a first recipient node, for transmitting the packet from the hub node to an appropriate node, routing the packet to the first recipient node, said flow-control subsystem, responsive to the traffic congestion and to a plurality of packets having voice data, for routing the plurality of packets through a path in the plurality of nodes to ensure that the plurality of packets arrive sequentially; and
   said hub node, responsive to an information packet arriving from a central office, for routing the information packet to a second recipient node.

2. A distributed network, spread-spectrum system, comprising:
   a plurality of remote stations;
   a plurality of nodes for covering a geographic area, the plurality of nodes including a set of hub nodes, each node covering a micro-cell having a radius less than one mile, each node including,
      a spread-spectrum transceiver for communicating, using packets having spread-spectrum modulation, over radio waves, with the plurality of remote stations, each packet having a source address and a destination address;
      a store-and-forward subsystem, coupled to the spread-spectrum transceiver, for storing and forwarding one or more packets to and from the remote station, and for storing and forwarding the one or more packets to and from another node in the plurality of nodes;
      a flow-control subsystem, coupled to the store-and-forward subsystem, for controlling the store-and-forward subsystem, to store each packet arriving at the spread-spectrum transceiver, said flow-control subsystem communicating traffic information between each of the nodes in the plurality of nodes, with the traffic information including traffic density at each of the nodes, said flow-control subsystem, responsive to the traffic information and to a packet having the destination address to a particular hub node, for routing the packet through appropriate nodes to the particular hub node, said flow-control subsystem, responsive to the traffic at each node, each packet having a destination address to a first recipient node, for transmitting the packet from the particular hub node to an appropriate node, routing the packet to the first recipient node, said flow-control subsystem, responsive to the traffic congestion and to a plurality of packets having voice data, for routing the plurality of packets through a path in the plurality of nodes to ensure that the plurality of packets arrive sequentially; and
   said particular hub node, responsive to an information packet arriving from a central office, for routing the information packet to a second recipient node.

3. A distributed network, spread-spectrum method, for a plurality of remote stations and a plurality of nodes for covering a geographic area, the plurality of nodes including a hub node, each node covering a micro-cell having a radius less than one mile, comprising the steps of:
   communicating, using packets having spread-spectrum modulation, over radio waves, with the plurality of remote stations, each packet having a source address and a destination address;
   storing and forwarding one or more packets to and from the remote station;
   storing and forwarding the one or more packets to and from another node in the plurality of nodes;

controlling the steps of storing and forwarding, to store each packet arriving at the spread-spectrum transceiver;

communicating traffic information between each of the nodes in the plurality of nodes, with the traffic information including traffic density at each of the nodes;

routing, in response to the traffic information and to a packet having the destination address to the hub node, the packet through appropriate nodes to the hub node;

transmitting, in response to the traffic at each node, each packet having a destination address to a first recipient node;

transmitting the packet from the hub node to an appropriate node;

routing the packet to the first recipient node;

routing, in response to the traffic congestion and to a plurality of packets having voice data, the plurality of packets through a path in the plurality of nodes to ensure that the plurality of packets arrive sequentially; and routing, in response to an information packet arriving from a central office, the information packet to a second recipient node.

4. A distributed network, spread-spectrum system, comprising:

a plurality of remote stations;

a plurality of nodes for covering a geographic area, each node in the plurality of nodes for communicating, with one or more remote stations of the plurality of remote stations, using packets having a destination address and modulated with spread-spectrum modulation, with each packet transmitted between a respective node and remote station using radio waves; and flow-control means for communicating traffic information between a first multiplicity of neighboring nodes of a first node of the plurality of nodes, with the first node capable of communicating a respective packet to a node in the first multiplicity of neighboring nodes, with the traffic information including traffic density at each of the first multiplicity of neighboring nodes, said flow-control means, responsive to the traffic information and to the respective packet, from the first node, having a respective destination address of a respective destination node of the plurality of nodes, for selecting a second node of the first multiplicity of neighboring nodes, said flow-control means for routing, responsive to the traffic information, the respective packet through the second node to the respective destination node.

5. The distributed network, as set forth in claim 4, with said flow-control means for communicating traffic information between a second multiplicity of neighboring nodes of the second node, with the second node capable of communication the respective packet to a node in the second multiplicity of neighboring nodes, with the traffic information including traffic density at each of the second multiplicity of neighboring nodes, said flow-control means, responsive to the traffic information and to the respective packet, from the second node, having the respective destination address of the respective destination node, for selecting a third node of the second multiplicity of neighboring nodes, said flow-control means, responsive to the traffic information, for routing the respective packet through the third node to the respective destination node.

6. The distributed network, as set forth in claim 5, with said flow-control means for communicating traffic information between a third multiplicity of neighboring nodes of the third node, with the third node capable of communicating the respective packet to a node in the third multiplicity of neighboring nodes, with the traffic information including traffic density at each of the third multiplicity of neighboring nodes, said flow-control means, responsive to the traffic information and to the respective packet, from the third node, having the respective destination address of the respective destination node, for selecting a fourth node of the third multiplicity of neighboring nodes, said flow-control means, responsive to the traffic information, for routing the respective packet through the fourth node to the respective destination node.

7. The distributed network, as set forth in claim 6, with said flow-control means for communicating traffic information between a fourth multiplicity of neighboring nodes of the fourth node, with the fourth node capable of communicating the respective packet to a node in the fourth multiplicity of neighboring nodes, with the traffic information including traffic density at each of the fourth multiplicity of neighboring nodes, said flow-control means, responsive to the traffic information and to the respective packet, from the fourth node, having the respective destination address of the respective destination node, for selecting a fifth node of the fourth multiplicity of neighboring nodes, said flow-control means, responsive to the traffic information, for routing the respective packet through the fifth node to the respective destination node.

8. The distributed network, as set forth in claim 7, with said flow-control means for communicating traffic information between a fifth multiplicity of neighboring nodes of the fifth node, with the fifth node capable of communicating the respective packet to a node in the fifth multiplicity of neighboring nodes, with the traffic information including traffic density at each of the fifth multiplicity of neighboring nodes, said flow-control means, responsive to the traffic information and to the respective packet, from the fifth node, having the respective destination address of the respective destination node, for selecting a sixth node of the fifth multiplicity of neighboring nodes, said flow-control means, responsive to the traffic information, for routing the respective packet through the sixth node to the respective destination node.

9. The distributed network, as set forth in claim 8, with said flow-control means for communicating traffic information between a sixth multiplicity of neighboring nodes of the sixth node, with the sixth node capable of communicating a respective packet to a node in the sixth multiplicity of neighboring nodes, with the traffic information including traffic density at each of the sixth multiplicity of neighboring nodes, said flow-control means, responsive to the traffic information and to the respective packet, from the sixth node, having the respective destination address of the respective destination node, for selecting a seventh node of the sixth multiplicity of neighboring nodes, said flow-control means, responsive to the traffic information, for routing the respective packet through the seventh node to the respective destination node.

10. A distributed network, spread-spectrum system, comprising:

a plurality of remote stations;

a plurality of nodes for covering a geographic area, each node in the plurality of nodes for communicating, with one or more remote stations of the plurality of remote stations, using packets having a destination address and modulated with spread-spectrum modulation, with each packet transmitted between a respective node and remote station using radio waves; and flow-control means for communicating first traffic information between a first multiplicity of neighboring nodes of a first node of the plurality of nodes, with the first node capable of communicating a respective packet to a node in the first multiplicity of neighboring nodes, with the first traffic information including traffic density at each of the first multiplicity of neighboring nodes, said flow-control means, responsive to the first traffic information and to the respective packet, from the first node, having a respective destination address of a respective destination node of the plurality of nodes, for selecting a second node of the first multiplicity of neighboring nodes, said flow-control means for responsive to the first traffic information, the respective packet through the second node to the respective destination node.

11. The distributed network, as set forth in claim 10, with said flow-control means for communicating second traffic information between a second multiplicity of neighboring nodes of the second node, with the second node capable of communicating a respective packet to a node in the second multiplicity of neighboring nodes, with the second traffic information including traffic density at each of the second multiplicity of neighboring nodes, said flow-control means, responsive to the second traffic information and to the respective packet, from the second node, having the respective destination address of the respective destination node, for selecting a third node of the second multiplicity of neighboring nodes, said flow-control means, responsive to the second traffic information, for routing the respective packet through the third node to the respective destination node.

12. The distributed network, as set forth in claim 11, with said flow-control means for communicating third traffic information between a third multiplicity of neighboring nodes of the third node, with the third node capable of communicating a respective packet to a node in the third multiplicity of neighboring nodes, with the third traffic information including traffic density at each of the third multiplicity of neighboring nodes, said flow-control means, responsive to the third traffic information and to the respective packet, from the third node, having the respective destination address of the respective destination node, for selecting a fourth node of the third multiplicity of neighboring nodes, said flow-control means, responsive to the third traffic information, for routing the respective packet through the fourth node to the respective destination node.

13. The distributed network, as set forth in claim 12, with said flow-control means for communicating fourth traffic information between a fourth multiplicity of neighboring nodes of the fourth node, with the fourth node capable of communicating a respective packet to a node in the fourth multiplicity of neighboring nodes, with the fourth traffic information including traffic density at each of the fourth multiplicity of neighboring nodes, said flow-control means, responsive to the fourth traffic information and to the respective packet, from the fourth node, having the respective destination address of the respective destination node, for selecting a fifth node of the fourth multiplicity of neighboring nodes, said flow-control means, responsive to the fourth traffic information, for routing the respective packet through the fifth node to the respective destination node.

14. The distributed network, as set forth in claim 13, with said flow-control means for communicating fifth traffic information between a fifth multiplicity of neighboring nodes of the fifth node, with the fifth node capable of communicating a respective packet to a node in the fifth multiplicity of neighboring nodes, with the fifth traffic information including traffic density at each of the fifth multiplicity of neighboring nodes, said flow-control means, responsive to the fifth traffic information and to the respective packet, from the fifth node, having the respective destination address of the respective destination node, for selecting a sixth node of the fifth multiplicity of neighboring nodes, said flow-control means, responsive to the fifth traffic information, for routing the respective packet through the sixth node to the respective destination node.

15. The distributed network, as set forth in claim 14, with said flow-control means for communicating sixth traffic information between a sixth multiplicity of neighboring nodes of the sixth node, with the sixth node capable of communicating a respective packet to a node in the sixth multiplicity of neighboring nodes, with the sixth traffic information including traffic density at each of the sixth multiplicity of neighboring nodes, said flow-control means, responsive to the sixth traffic information and to the respective packet, from the sixth node, having the respective destination address of the respective destination node, for selecting a seventh node of the sixth multiplicity of neighboring nodes, said flow-control means, responsive to the sixth traffic information, for routing the respective packet through the seventh node to the respective destination node.

16. A distributed network, spread-spectrum method, having a plurality of remote stations and a plurality of nodes for covering a geographic area, comprising the steps of:

communicating, between a node of the plurality of nodes and one or more remote stations of the plurality of remote stations, using packets having a destination address and modulated with spread-spectrum modulation, with each packet transmitted between a respective node and remote station using radio waves;

communicating traffic information between a first multiplicity of neighboring nodes of a first node of the plurality of nodes, with the first node capable of communicating a respective packet to a node in the first multiplicity of neighboring nodes, with the traffic information including traffic density at each of the first multiplicity of neighboring nodes;

selecting, responsive to the traffic information and to the respective packet, from the first node, having a respective destination address of a respective destination node of the plurality of nodes, a second node of the first multiplicity of neighboring nodes; and routing, responsive to the traffic information, the respective packet through the second node to the respective destination node.

17. The distributed network, spread-spectrum method, as set forth in claim 16, further comprising the steps:

communicating traffic information between a second multiplicity of neighboring nodes of the second node, with the second node capable of communication the respective packet to a node in the second multiplicity of neighboring nodes, with the traffic information including traffic density at each of the second multiplicity of neighboring nodes;

selecting, responsive to the traffic information and to the respective packet, from the second node, having the respective destination address of the respective destination node, a third node of the second multiplicity of neighboring nodes; and routing, responsive to the traffic information, the respective packet through the third node to the respective destination node.

18. The distributed network, spread-spectrum method, as set forth in claim 17, further comprising the steps:

communicating traffic information between a third multiplicity of neighboring nodes of the third node, with the third node capable of communicating the respective packet to a node in the third multiplicity of neighboring nodes, with the traffic information including traffic density at each of the third multiplicity of neighboring nodes;

selecting, responsive to the traffic information and to the respective packet, from the third node, having the respective destination address of the respective destination node, a fourth node of the third multiplicity of neighboring nodes; and routing, responsive to the traffic information, the respective packet through the fourth node to the respective destination node.

19. The distributed network, spread-spectrum method, as set forth in claim 18, further comprising the steps:

communicating traffic information between a fourth multiplicity of neighboring nodes of the fourth node, with the fourth node capable of communicating the respective packet to a node in the fourth multiplicity of neighboring nodes, with the traffic information including traffic density at each of the fourth multiplicity of neighboring nodes;

selecting, responsive to the traffic information and to the respective packet, from the fourth node, having the respective destination address of the respective destination node, a fifth node of the fourth multiplicity of neighboring nodes; and routing, responsive to the traffic information, the respective packet through the fifth node to the respective destination node.

20. The distributed network, spread-spectrum method, as set forth in claim 19, further comprising the steps:

communicating traffic information between a fifth multiplicity of neighboring nodes of the fifth node, with the fifth node capable of communicating the respective packet to a node in the fifth multiplicity of neighboring nodes, with the traffic information including traffic density at each of the fifth multiplicity of neighboring nodes;

selecting, responsive to the traffic information and to the respective packet, from the fifth node, having the respective destination address of the respective destination node, a sixth node of the fifth multiplicity of neighboring nodes; and routing, responsive to the traffic information, the respective packet through the sixth node to the respective destination node.

21. The distributed network, spread-spectrum method, as set forth in claim 20, further comprising the steps:

communicating traffic information between a sixth multiplicity of neighboring nodes of the sixth node, with the sixth node capable of communicating a respective packet to a node in the sixth multiplicity of neighboring nodes, with the traffic information including traffic density at each of the sixth multiplicity of neighboring nodes;

selecting, responsive to the traffic information and to the respective packet, from the sixth node, having the respective destination address of the respective destination node, for selecting a seventh node of the sixth multiplicity of neighboring nodes; and routing, responsive to the traffic information, the respective packet through the seventh node to the respective destination node.

22. A distributed network, spread-spectrum method, having a plurality of remote stations and a plurality of nodes for covering a geographic area, comprising the steps of:

communicating, between a node of the plurality of nodes and one or more remote stations of the plurality of remote stations, using packets having a destination address and modulated with spread-spectrum modulation, with each packet transmitted between a respective node and remote station using radio waves;

communicating first traffic information between a first multiplicity of neighboring nodes of a first node of the plurality of nodes, with the first node capable of communicating a respective packet to a node in the first multiplicity of neighboring nodes, with the first traffic information including traffic density at each of the first multiplicity of neighboring nodes;

selecting, responsive to the first traffic information and to the respective packet, from the first node, having a respective destination address of a respective destination node of the plurality of nodes, a second node of the first multiplicity of neighboring nodes; and routing, responsive to the first traffic information, the respective packet through the second node to the respective destination node.

23. The distributed network, spread-spectrum method, as set forth in claim 22, further comprising the steps:, communicating second traffic information between a second multiplicity of neighboring nodes of the second node, with the second node capable of communicating a respective packet to a node in the second multiplicity of neighboring nodes, with the second traffic information including traffic density at each of the second multiplicity of neighboring nodes;

selecting, responsive to the second traffic information and to the respective packet, from the second node, having the respective destination address of the respective destination node, a third node of the second multiplicity of neighboring nodes; and routing, responsive to the second traffic information, the respective packet through the third node to the respective destination node.

24. The distributed network, spread-spectrum method, as set forth in claim 23, further comprising the steps:

communicating third traffic information between a third multiplicity of neighboring nodes of the third node, with the third node capable of communicating a respective packet to a node in the third multiplicity of neighboring nodes, with the third traffic information including traffic density at each of the third multiplicity of neighboring nodes;

selecting, responsive to the third traffic information and to the respective packet, from the third node, having the respective destination address of the respective destination node, a fourth node of the third multiplicity of neighboring nodes; and routing, responsive to the third traffic information, the respective packet through the fourth node to the respective destination node.

25. The distributed network, spread-spectrum method, as set forth in claim 24, further comprising the steps:

communicating fourth traffic information between a fourth multiplicity of neighboring nodes of the fourth node, with the fourth node capable of communicating a respective packet to a node in the fourth multiplicity of neighboring nodes, with the fourth traffic information including traffic density at each of the fourth multiplicity of neighboring nodes;

selecting, responsive to the fourth traffic information and to the respective packet, from the fourth node, having the respective destination address of the respective destination node, a fifth node of the fourth multiplicity of neighboring nodes; and routing, responsive to the fourth traffic information, the respective packet through the fifth node to the respective destination node.

26. The distributed network, spread-spectrum method, as set forth in claim 25, further comprising the steps:

communicating fifth traffic information between a fifth multiplicity of neighboring nodes of the fifth node, with the fifth node capable of communicating a respective packet to a node in the fifth multiplicity of neighboring nodes, with the fifth traffic information including traffic density at each of the fifth multiplicity of neighboring nodes;1 selecting, responsive to the fifth traffic information and to the respective packet, from the fifth node, having the respective destination address of the respective destination node, a sixth node of the fifth multiplicity of neighboring nodes; and routing, responsive to the fifth traffic information, the respective packet through the sixth node to the respective destination node.

27. The distributed network, spread-spectrum method, as set forth in claim 26, further comprising the steps:

communicating sixth traffic information between a sixth multiplicity of neighboring nodes of the sixth node, with the sixth node capable of communicating a respective packet to a node in the sixth multiplicity of neighboring nodes, with the sixth traffic information including traffic density at each of the sixth multiplicity of neighboring nodes;

selecting, responsive to the sixth traffic information and to the respective packet, from the sixth node, having the respective destination address of the respective destination node, a seventh node of the sixth multiplicity of neighboring nodes; and routing, responsive to the sixth traffic information, the respective packet through the seventh node to the respective destination node.

28. The distributed network as set for in claim 4, 5, 6, 7, 8, 9, 10, 11, 12, 13, 14 or 15, with said flow-control means including means for communicating with radio waves.

29. The distributed network as set for in claim 4, 5, 6, 7, 8, 9, 10, 11, 12, 13, 14 or 15, with said flow-control means including means for communicating with spread-spectrum modulation using radio waves.

30. The distributed-network, spread-spectrum method as set forth in claim 16, 17, 18, 19, 20, 21, 22, 23, 24, 25, 26 or 27, with the routing step including the step of modulating the packet with spread-spectrum modulation.

31. The distributed-network, spread-spectrum method as set forth in claim 16, 17, 18, 19, 20, 21, 22, 23, 24, 25, 26 or 27, with the routing step including the step of transmitting, using radio waves, the packet with spread-spectrum modulation.

32. A distributed network, spread-spectrum system, comprising:

a plurality of remote stations;

a plurality of nodes for covering a geographic area, each node in the plurality of nodes for communicating, with one or more remote stations of the plurality of remote stations, using packets having a destination address and modulated with spread-spectrum modulation, with each packet transmitted between a respective node and remote station using radio waves; and flow-control means for communicating traffic information between the plurality of nodes, with the traffic information including traffic density at each of the plurality of nodes, said flow-control means, responsive to the traffic information and to a respective packet, from a first node, having a respective destination address of a respective destination node of the plurality of nodes, for selecting a path of a multiplicity of nodes through the plurality of nodes to the destination node, said flow-control means for routing, responsive to the traffic information, the respective packet through the path of the multiplicity of nodes to the respective destination node.

33. A distributed network, spread-spectrum method, having a plurality of nodes, comprising the steps of:

communicating, to a respective node of the plurality of nodes, with one or more remote stations of a plurality of remote stations, using packets having a destination address and modulated with spread-spectrum modulation, with each packet transmitted between the respective node and remote station using radio waves;

communicating traffic information between the plurality of nodes, with the traffic information including traffic density at each of the plurality of nodes;

selecting, responsive to the traffic information and to a respective packet, from the respective node, having a respective destination address of a respective destination node of the plurality of nodes, a path of a multiplicity of nodes through the plurality of nodes to the destination node; and routing, responsive to the traffic information, the respective packet through the path of the multiplicity of nodes to the respective destination node.

34. The distributed network as set for in claim 32, with said flow-control means including means for communicating with radio waves.

35. The distributed network as set for in claim 32, with said flow-control means including means for communicating with spread-spectrum modulation using radio waves.

36. The distributed-network, spread-spectrum method as set forth in claim 33, with the routing step including the step of modulating the packet with spread-spectrum modulation.

37. The distributed-network, spread-spectrum method as set forth in claim 33, with the routing step including the step of transmitting, using radio waves, the packet with spread-spectrum modulation.

* * * * *

US006493377C1

(12) EX PARTE REEXAMINATION CERTIFICATE (10256th)
United States Patent
Schilling et al.

(10) Number: US 6,493,377 C1
(45) Certificate Issued: Aug. 12, 2014

(54) DISTRIBUTED NETWORK, SPREAD-SPECTRUM SYSTEM

(75) Inventors: Donald L. Schilling, Palm Beach Gardens, FL (US); Joseph Garodnick, Canterville, MA (US)

(73) Assignee: Linex Technologies, Inc., West Long Branch, NJ (US)

Reexamination Request:
No. 90/013,002, Sep. 20, 2013

Reexamination Certificate for:
Patent No.: 6,493,377
Issued: Dec. 10, 2002
Appl. No.: 09/729,911
Filed: Dec. 6, 2000

(51) Int. Cl.
*H04L 12/56* (2006.01)
*H04B 1/69* (2011.01)
*H04Q 7/22* (2006.01)
*H04B 7/005* (2006.01)

(52) U.S. Cl.
USPC ........... 375/130; 370/342; 370/353; 370/441; 375/E1.001

(58) Field of Classification Search
None
See application file for complete search history.

(56) References Cited

To view the complete listing of prior art documents cited during the proceeding for Reexamination Control Number 90/013,002, please refer to the USPTO's public Patent Application Information Retrieval (PAIR) system under the Display References tab.

*Primary Examiner* — Minh Dieu Nguyen (57) ABSTRACT

A distributed network, spread-spectrum system comprising a plurality of remote stations and a plurality of nodes. One or more hub node(s) connect(s) to a central telephone office. A node's spread-spectrum transceiver communicates, using packets having spread-spectrum modulation, over radio waves, with the plurality of remote stations. Each packet has a source address and a destination address, and may have other information such as a header, start of message, end of message, flow-control information, forward error correction, and message data. A store-and-forward subsystem stores and forwards one or more packets to and from the remote station. The store-and-forward subsystem stores and forwards the one or more packets to and front another node in the plurality of nodes. A flow-control subsystem controls the store-and-forward subsystem, to store each packet arriving at the spread-spectrum transceiver. The flow-control subsystem communicates traffic information between each of the nodes in the plurality of nodes. The flow-control subsystem routes the packet through appropriate nodes to the hub node from a remote station. Based on the traffic at each node, the flow-control subsystem transmits the packet from the hub node to an appropriate node, and routes the packet to a recipient remote station. The flow-control subsystem routes the plurality of packets through a path in the plurality of nodes to ensure that the plurality of packets arrive sequentially for voice or video packets.

At the time of issuance and publication of this certificate, the patent remains subject to pending reexamination control number 2014-00596 filed Apr. 8, 2014. The claim content of the patent may be subsequently revised if a reexamination certificate issues from the reexamination proceeding.

US 6,493,377 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 16-21 and 30-31 are cancelled.

Claims 1-4, 10, 22, 28-29, 32 and 33 are determined to be patentable as amended.

Claims 5-9, 11-15, 23-27 and 34-37, dependent on an amended claim, are determined to be patentable.

1. A distributed network, spread-spectrum system, comprising:
   a plurality of remote stations;
   a plurality of *fixed* nodes *forming the distributed network* for covering a *particular* geographic area, the plurality of *fixed* nodes including a hub node, each *fixed* node covering a micro-cell having a radius less than one mile; each *fixed* node including,
      a *plurality of* spread-spectrum [transceiver] *transceivers* for communicating, using packets having spread-spectrum modulation, over radio waves, with the plurality of remote stations, each packet having a source address and a destination address;
      *a particular remote station of the plurality of remote stations being capable of accessing, using radio waves, a first fixed node in the distributed network, employing traffic information sent by the first fixed node, and sending one or more packets to the first fixed node thereby using minimum power;*
      a store-and-forward subsystem, coupled to the spread-spectrum transceiver, for storing and forwarding one or more packets to and from the remote station, and for storing and forwarding the one or more packets to and from another *fixed* node in the plurality of *fixed* nodes;
      a flow-control subsystem, coupled to the store-and-forward subsystem, for controlling the store-and-forward subsystem, to store each packet arriving at the spread-spectrum [transceiver] *transceivers*, said flow-control subsystem communicating traffic information between each of the *fixed* nodes in the plurality of *fixed* nodes, with the traffic information including traffic density at each of the nodes, said flow-control subsystem, responsive to the traffic information and to a packet having the destination address to the hub node, for routing the packet through appropriate nodes to the hub node, said flow-control subsystem, responsive to the traffic at each *fixed* node, each packet having a destination address to a first recipient node, for transmitting the packet from the hub node to an appropriate node, routing the packet to the first recipient node, said flow-control subsystem, responsive to the traffic congestion and to a plurality of packets having voice data, for routing the plurality of packets through a path in the plurality of *fixed* nodes to ensure that the plurality of packets arrive sequentially; and
   said hub node, responsive to an information packet arriving from a central office, for routing the information packet to a second recipient node.

2. A distributed network, spread-spectrum system, comprising:
   a plurality of remote stations;
   a plurality of *fixed* nodes *forming the distributed network* for covering a *particular* geographic area, the plurality of *fixed* nodes including a set of hub nodes, each *fixed* node covering a micro-cell having a radius less than one mile, each *fixed* node including[.]
      a *plurality of* spread-spectrum [transceiver] *transceivers* for communicating, using packets having spread-spectrum modulation, over radio waves, with the plurality of remote stations, each packet having a source address and a destination address;
      *a particular remote station of the plurality of remote stations being capable of accessing, using radio waves, a first fixed node in the distributed network, employing traffic information sent by the particular first fixed node, and sending one or more packets to said particular first fixed node thereby using minimum power;*
      a store-and-forward subsystem, coupled to the spread-spectrum [transceiver] *transceivers*, for storing and forwarding one or more packets to and from the remote station, and for storing and forwarding the one or more packets to and from another *fixed* node in the plurality of *fixed* nodes;
      a flow-control subsystem, coupled to the store-and-forward subsystem, for controlling the store-and-forward subsystem, to store each packet arriving at the spread-spectrum [transceiver] *transceivers*, said flow-control subsystem communicating traffic information between each of the *fixed* nodes in the plurality of *fixed* nodes, with the traffic information including traffic density at each of the *fixed* nodes, said flow-control subsystem, responsive to the traffic information and to a packet having the destination address to a particular hub node, for routing the packet through appropriate *fixed* nodes to the particular hub node;
      said flow-control subsystem, responsive to the traffic at each *fixed* node, each packet having a destination address to a first recipient node, for transmitting the packet from the particular hub node to an appropriate *fixed* node, routing the packet to the first recipient node, said flow-control subsystem, responsive to the traffic congestion and to a plurality of packets having voice data, for routing the plurality of packets through a path in the plurality of *fixed* nodes to ensure that the plurality of packets arrive sequentially; and
   said particular hub node, responsive to an information packet arriving from a central office, for routing the information packet to a second recipient node.

3. A distributed network, spread-spectrum method, for a plurality of remote stations and a plurality of *fixed* nodes for covering a *particular* geographic area, the plurality of *fixed* nodes *forming the distributed network* including a hub node, each node covering a micro-cell having a radius less than one mile, *and each fixed node having a plurality of transceivers,* comprising the steps of:
   *the plurality of fixed nodes* communicating, using packets having spread-spectrum modulation, over radio waves, with the plurality of remote stations, each packet having a source address and a destination address, *each fixed node in the plurality of fixed nodes being capable of transmitting to and receiving from a second fixed node selected from two or more nodes*;

the plurality of fixed nodes transmitting traffic information, using spread-spectrum modulation, *the plurality of remote stations, using the traffic information and being capable of accessing a first fixed node in the distributed network, and a particular remote station sending one or more packets to the first fixed node, thereby using minimum power;* storing and forwarding one or more packets to and from the remote station;

storing and forwarding the one or more packets to and from another *fixed* node in the plurality of *fixed* nodes;

controlling the steps of storing and forwarding, to store each packet arriving at the spread-spectrum [transceiver] *transceivers*;

communicating traffic information between each of the *fixed* nodes in the plurality of *fixed* nodes, with the traffic information including traffic density at each of the *fixed* nodes;

routing, in response to the traffic information *at a fixed node* and to a packet having the destination address to the hub node, the packet through appropriate *fixed* nodes to the hub node;

transmitting, in response to the traffic *information* at each *fixed* node, each packet having a destination address to a first recipient node;

transmitting *in response to the traffic information at each fixed node* the packet from the hub node to an appropriate node;

routing the packet to the first recipient node;

routing in response to the traffic congestion and to a plurality of packets having voice data, the plurality of packets through a path in the plurality of *fixed* nodes to ensure that the plurality of packets arrive sequentially; and routing, in response to an information packet arriving from a central office, the information packet to a second recipient node.

4. A distributed network, spread-spectrum system, comprising:

a plurality of remote stations;

a plurality of *fixed* nodes *forming the distributed network* for covering a *particular* geographic area, *each fixed node covering a micro-cell having a radius less than one mile,* each *fixed* node in the plurality of *fixed* nodes *being capable of transmitting and receiving from a fixed node selected from two or more fixed nodes and including a plurality of spread-spectrum transceivers* for communicating, with one or more remote stations of the plurality of remote stations, using packets having a destination address and modulated with spread-spectrum modulation, with each packet transmitted between a respective node and remote station using radio waves, *the plurality of remote stations being capable of accessing, using radio waves, a first node in the distributed network, employing traffic information sent by the plurality of fixed nodes, and sending one or more packets to the first node thereby using minimum power*; and flow-control means for communicating traffic information between a first multiplicity of neighboring nodes of a first *fixed* node of the plurality of *fixed* nodes, with the first node capable of communicating a respective packet to a node in the first multiplicity of neighboring nodes, with the traffic information including traffic density at each of the first multiplicity of neighboring nodes, said flow-control means, responsive to the traffic information and to the respective packet, from the first node, having a respective destination address of a respective destination node of the plurality of *fixed* nodes, for selecting a second node of the first multiplicity of neighboring nodes, said flow-control means for routing, responsive to the traffic information, the respective packet through the second node to the respective destination node.

10. A distributed network, spread-spectrum system, comprising:

a plurality of remote stations;

a plurality of *fixed* nodes *forming the distributed network* for covering a *particular* geographic area, each *fixed* node in the plurality of *fixed* nodes *including a plurality of spread-spectrum transceivers* for communicating, with one or more remote stations of the plurality of remote stations, using packets having a destination address and modulated with spread-spectrum modulation, with each packet transmitted between a respective node and remote station using radio waves *and each fixed node in the plurality of fixed nodes being capable of transmitting to and receiving from a second node selected from two or more nodes*;

*the plurality of remote stations being capable of accessing, using radio waves, a first node in the distributed network, employing traffic information sent by the plurality of fixed nodes, and sending one or more packets to a particular first node thereby allowing the remote stations to select a first node using minimum power;* and flow-control means for communicating first traffic information between a first multiplicity of neighboring nodes of a first node of the plurality of *fixed* nodes, with the first node capable of communicating a respective packet to a *fixed* node in the first multiplicity of neighboring nodes, with the first traffic information including traffic density at each of the first multiplicity of neighboring nodes, said flow-control means, responsive to the first traffic information and to the respective packet, from the first node, having a respective destination address of a respective destination node of the plurality of *fixed* nodes, for selecting a second node of the first multiplicity of neighboring nodes, said flow-control means [for] responsive to the first traffic information, *for transmitting* the respective packet through the second node to the respective destination node.

22. A distributed network, spread-spectrum method, having a plurality of remote stations and a plurality of *fixed* nodes *forming the distributed network* for covering a *particular* geographic area, *each fixed node covering a fixed micro-cell having a radius less than one mile and each fixed node in the plurality of fixed nodes being capable of transmitting to and receiving from a second node selected from two or more nodes, the plurality of fixed nodes each including a plurality of transceivers, transmitting traffic information using low power radio signals to one or more remote stations located within each node's fixed micro-cell, and with a particular remote station required to transmit one or more packets, receiving said traffic information, accessing said first node and transmitting the packets to the nearby first node* comprising the steps of:

communicating, between a *fixed* node of the plurality of *fixed* nodes and one or more remote stations of the plurality of remote stations, using packets having a destination address and modulated with spread-spectrum modulation, with each packet transmitted between a respective node and remote station using radio waves;

communicating first traffic information between a first multiplicity of neighboring nodes of a first *fixed* node of the plurality of *fixed* nodes, with the first *fixed* node capable of communicating a respective packet to a node in the first multiplicity of neighboring nodes, with the first traffic information including traffic density at each of the first multiplicity of neighboring nodes;

selecting, responsive to the first traffic information and to the respective packet, from the first *fixed* node, having a respective destination address of a respective destination node of the plurality of *fixed* nodes, a second node of the first multiplicity of neighboring nodes; and routing, responsive to the first traffic information, the respective packet through the second node to the respective destination node.

28. The distributed network as set [for] *forth* in claim 4, 5, 6, 7, 8, 9, 10, 11, 12, 13, 14 or 15, with said flow-control means including means for communicating with radio waves.

29. The distributed network as set [for] *forth* in claim 4, 5, 6, 7, 8, 9, 10, 11, 12, 13, 14 or 15, with said flow-control means including means for communicating with spread-spectrum modulation using radio waves.

32. A distributed network, spread-spectrum system, comprising:

a plurality of remote stations;

a plurality of *fixed* nodes *forming the distributed network* for covering a *particular* geographic area, *each fixed node covering a fixed micro-cell having a radius less than one mile, each fixed node in the plurality of fixed nodes being capable of transmitting and receiving from a second node selected from two or more nodes, and* each node in the plurality of *fixed* nodes *including a plurality of spread-spectrum transceivers* for communicating, with one or more remote stations of the plurality of remote stations, using packets having a destination address and modulated with spread-spectrum modulation, with each packet transmitted between a respective node and remote station using radio waves; [and]

a particular remote station of the plurality of remote stations being capable of accessing, using radio waves, a first node in the distributed network, employing traffic information sent by the plurality of fixed nodes, and sending one or more packets to the first node thereby using minimum power; and flow-control means for communicating traffic information between the plurality of *fixed* nodes, with the traffic information including traffic density at each of the plurality of *fixed* nodes, said flow-control means, responsive to the traffic information and to a respective packet, from [a] *the* first node, having a respective destination address of a respective destination node of the plurality of *fixed* nodes, for selecting a path of a multiplicity of nodes through the plurality of *fixed* nodes *including the second nodes* to the destination node, said flow-control means for routing, responsive to the traffic information, the respective packet through the path of the multiplicity of nodes to the respective destination node.

33. A distributed network, spread-spectrum method, having a plurality of *fixed* nodes *forming the distributed network, each of the plurality of fixed nodes including a plurality of transceivers, for covering a particular fixed geographic area, each fixed node covering a fixed micro-cell having a radius less than one mile, and each fixed node in the plurality of fixed nodes being capable of transmitting and receiving from a node selected from two or more nodes*, comprising the steps of:

communicating, to a respective node of the plurality of nodes, with one or more remote stations of a plurality of remote stations, using packets having a destination address and modulated with spread-spectrum modulation, with each packet transmitted between the respective node and remote station using radio waves;

*transmitting traffic information using low power radio signals from a first node of the plurality of fixed nodes to the plurality of remote stations located within the micro-cell formed by the first node;*

*transmitting said packets from one or more remote stations to the nearby first node within the micro-cell;* communicating traffic information between the plurality of *fixed* nodes, with the traffic information including traffic density at each of the plurality of *fixed* nodes;

selecting, responsive to the traffic information and to a respective packet, from the respective first node, having a respective destination address of a respective destination node of the plurality of *fixed* nodes, a path of a multiplicity of *fixed* nodes through the plurality of *fixed* nodes to the destination node; and routing, responsive to the traffic information, the respective packet through the path of the multiplicity of nodes to the respective destination node.

\* \* \* \* \*